XR 3,852,524

SEARCH ROOM

United Sta

[11] 3,852,524

Ando et al.

SUBSTITUTE FOR MISSING XR

[45] Dec. 3, 1974

[54] STEREOSCOPIC TELEVISION SYSTEM

[75] Inventors: Shigeru Ando; Takayuki Miyazawa, both of Amagasaki, Japan

[73] Assignee: Mitsubishi Denki Kabushiki Kaisha, Chiyoda-ku, Tokyo, Japan

[22] Filed: Feb. 9, 1972

[21] Appl. No.: 224,730

Related U.S. Application Data

[63] Continuation-in-part of Ser. No. 843,374, July 22, 1969, abandoned.

[30] Foreign Application Priority Data

July 22, 1968 Japan .............................. 43-51772

[52] U.S. Cl. .............................. 178/6.5, 350/167

[51] Int. Cl. .............................. H04n 9/54

[58] Field of Search ........ 178/6.5, DIG. 2; 350/131, 350/144, 167; 352/86; 95/18 P; 250/213 R

[56] References Cited

UNITED STATES PATENTS

| | | | |
|---|---|---|---|
| 1,935,471 | 11/1933 | Kanolt | 95/18 |
| 2,018,592 | 10/1935 | Arnulf | 350/167 |
| 2,313,947 | 3/1943 | Klinkum | 350/131 |
| 2,573,242 | 10/1951 | Bonnet | 95/18 P |
| 3,046,330 | 7/1962 | Ross | 178/6.5 |
| 3,273,458 | 9/1966 | Kohler | 88/61 |
| 3,384,752 | 5/1968 | Odone | 250/213 |
| 3,503,315 | 3/1970 | Demontebello | 95/18 P |

*Primary Examiner*—Howard W. Britton
*Assistant Examiner*—Michael A. Masinick
*Attorney, Agent, or Firm*—Robert E. Burns; Emmanuel J. Lobato; Bruce L. Adams

[57] ABSTRACT

Two fly's eye type lens systems are disposed in back-to-back relationship with an optical diffusion plate or an optical amplifier sandwiched between the two systems, and slightly spaced away from another lens system of similar construction to form an optical image on a photosensitive surface of a pickup tube. The picture tube has optically coupled to its phosphor screen a lens system similar to the last-mentioned lens system.

9 Claims, 8 Drawing Figures

STEREOSCOPIC TELEVISION SYSTEM

This is a continuation-in-part Application of our earlier patent application Ser. No. 843,374, filed on July 22, 1969 now abandoned.

BACKGROUND OF THE INVENTION

This invention relates to a television system for producing three dimensional vision.

Persons can have the visual perception of distance and relief by means of binocular parallax and stereoscopic photographs to which such binocular visual perception is applied are well known. If a viewer binocularly views two images of the same object photographed by a pair of similar objectives spaced away from each other by a certain distance, he can have three dimensional vision. The field of vision viewed in the photographs is determined by the position of one of the objectives relative to the other objective so that any movement of the viewer's eyes laterally or vertically to the plane of the photograph results in the field of vision itself remaining unchanged. Therefore true three dimensional vision is never obtained. This is true in the case of television systems to which the stereoscopic effect as above described is applied. For example, a picture tube could be operatively associated with a multiplicity of cylindrical lenses disposed side by side in a plane substantially parallel to the front plate of the tube with the cylindrical axes thereof directed perpendicularly to the horizontal lines of the raster on the front tube plate. This permits viewers to view separate images of the same scene on the picture tube by their two eyes. This measure however is disadvantageous in that any change in positions of the eyes of the viewer relative to the image on the picture tube causes not only no variation in the field of vision but also the stereoscopic effect fully disappeares provided that the viewers view the images on the picture tube with his two eyes lying approximately along the vertical axis of the front tube plate as when the viewer is lying on one side.

SUMMARY OF THE INVENTION

Accordingly it is an object of the present invention to provide a new and improved television system for reproducing three dimensional vision in the true sense so that if the viewers' eyes change their positions relative to the picture tube, the other side of the particular scene not previously viewed appears accordingly, or a new portion of the field of vision is developed. That is, the invention provides a television system for realistically reproducing an image of an object or a scene to be televised.

The invention accomplishes the above object by the provision of a television system for producing three dimensional vision including a television transmitter unit comprising pickup tube means for picking up an optical image of an object or a scene to be televised and producing an electrical signal, and television transmitter means for processing the electrical signal to transmit the processed signal, characterized by first focussing optical means of fly's eye type directed to the object or scene, second focussing optical means of fly's eye type interconnected in back-to-back relationship with the first optical means, the first and second optical means having a common focal surface, and third focussing optical means of fly's eye type opposed to the second optical means to form an optical image on the focal surface, the optical image being picked up by the pickup tube means of the television system.

The focussing optical means each may be a lens system of fly's eye type including a multiplicity of plano-convex spherical lens elements closely disposed in columns and rows.

An optical diffusion sheet or an optical amplifier may be advantageously interposed between the first and second fly's eye lens systems.

A picture tube means may have conveniently a lens system of fly's eye type optically coupled to the picture tube to have a focal surface coinciding with the image reproducing surface thereof.

A characteristic feature of the present invention is to realistically reproduce an image of any object actually disposed at any position after the image has been subject to the pickup, transmission and reproduction processes.

Another characteristic feature of the invention is to record and reproduce the three dimensional information concerning the configuration of any object or scene without the necessity of using any lens normally employed in the photographing operation.

BRIEF DESCRIPTION OF THE DRAWINGS

The present invention will become more readily apparent from the following detailed description taken in conjunction with the accompanying drawings in which.

DESCRIPTION OF THE PREFERRED EMBODIMENTS

Figure 1A:
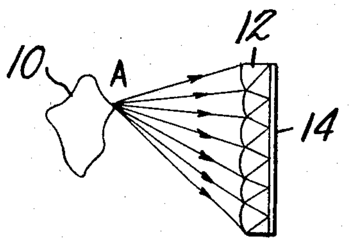
FIGS. 1*a* and *b* and FIGS. 2*a* and *b* are schematic views useful in explaining the principles of the invention.
Figure 1B:
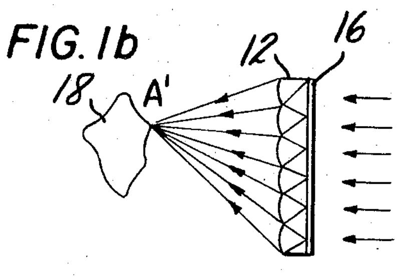

Referring now to the drawings, FIG. 1*a* illustrates the process of photographing an object in accordance with the principles of the invention while FIG. 1*b* illustrates the process of reproducing an image of the photographed object in accordance with the same principles. In FIG. 1*a* an object 10 to be photographed is focussed through a lens system 12 of fly's eye type onto a photosensitive medium 14 or a photographic dry-plate or the like disposed in a suitable dark space (not shown) in order to expose the medium 14 only to the light passed through the lens system 12. The lens system 12 consists of a multiplicity of small plano-convex lens elements closely disposed in columns and rows in a plane. For example, light from a point A on the object 10 falls upon each of the lens elements of the lens system 12 as shown at the arrows in FIG. 1*a* to form on the photosensitive medium 14 images equal in number and array to the individual lens elements of the lens system 12. The exposed medium is then developed and reversed in the well known manner to provide a positive plate. Thereafter the positive plate is returned to its original position which is, in turn, designated by the reference numeral 16 in FIG. 1*b*.

In FIG. 1*b* the object 10 is removed and the positive plate at its position 16 is exposed to white light coming from that side thereof remote from the lens system 12 or the rear side. Then light emerging from the multiplicity of images recorded on the plate 16 passes through the lens system 12 and advances along the respective paths identical to but reversed in direction from those in the photographing operation of FIG. 1*a* to form an image 18 at a position which is the same as the position where the object 10 was initially located. For example, light emerging from the recorded images at that position corresponding to the position A on the object 10 is focussed at a position A′ which the position A on the object 10 initially occupied. Light emerging from other points on the recorded images is similarly focussed at the corresponding points respectively. In other words, the real image of the object 10 is reproduced at a position which is the same as the position actually occupied by the object 10. If the image 18 thus formed is viewed from the front thereof with the viewer' s eyes disposed outside both the lens system 12 and the image 18, the viewer will view it as a real image that is inverse in convexity and concavity from the object 10 viewed by the lens system 12. That is, a strange image is viewed.

Figure 2A:
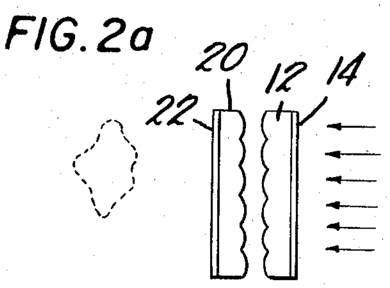
Figure 2B:
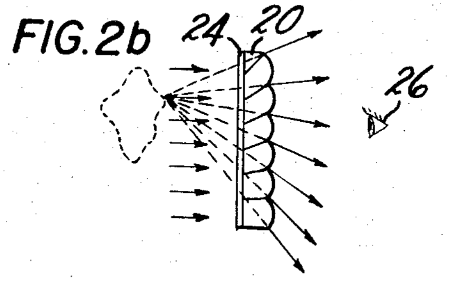

FIG. 2 shows one approach to eliminate the objection just described. FIG. 2*a* illustrates the manner in which a proper positive plate is prepared from the positive plate 16 as shown in FIG. 1*b*, and FIG. 2*b* illustrates the process of reproducing the image of the object recorded on the proper positive plate.

As shown in FIG. 2*a* the lens system 12 with the positive plate 16 as shown in FIG. 1*b* has a similar lens system 20 disposed in spaced parallel relationship therewith, with the curved surfaces of the two lens systems facing each other. Then a photosensitive medium 22 such as the medium 14 is disposed on an image surface provided by the lens system 20. Under these circumstances the photosensitive medium 22 is exposed to white light through the positive plate 16, and the lens system 12 and 20 as shown by the arrows in FIG. 2*a*. The exposed medium is developed and reversed in the conventional manner to provide a corrected positive plate.

The positive plate thus prepared is disposed at a position 24 (see FIG. 2*b*) or on the image surface of the lens system 20. If white light illuminates the corrected positive plate 24 from the side thereof remote from the lens system 20, the light emerging from the lens system 20 is propagated as if it were emitted from the object 10 located at its original position as will be readily understood from the description for FIG. 1. Therefore the viewer's eyes 26 can view an imaginary image at its position where the object 10 was originally located. Since the viewer now views the rays of light just as if the object 10 were actually located at the position of the imaginary image, the viewed image is not inverted in concavity and convexity, with the result that the viewer views an image that would be viewed provided that the object were put at the said position. That is, the viewer can have a three dimensional vision in the true sense. The invention is based upon the principles as above described.

Figure 3:
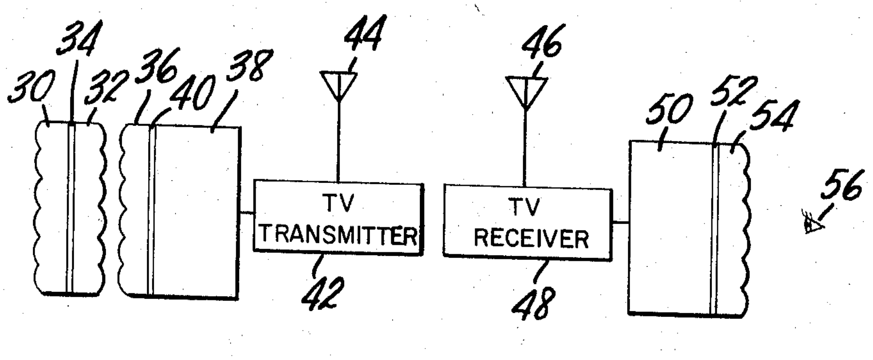
FIG. 3 is a schematic view of a stereoscopic television system constructed in accordance with the present invention.

Referring now to FIG. 3, there is illustrated one embodiment according to the stereoscopic television system of the invention. The transmitter unit of the television system is shown at the left and the receiver unit thereof is shown at the right. In FIG. 3, a pair of first and second fly's eye type lens systems 30 and 32, similar in construction to the lens system 12 shown in FIG. 1*a*, are interconnected in back-to-back relationship with a light transmissive optical diffusion sheet 34 interposed between the flat surfaces of both the systems. The first and second lens systems 30 and 32 have a common focal surface. A third fly's eye type lens system 36, also similar in construction to the lens system 12 as previously described, is disposed in spaced opposite relationship with the second lens system 32 with the curved surfaces of the two systems facing each other.

The third lens system 36 is optically coupled to a pickup tube 38 such as a vidicon including a photosensitive layer 40 on its front face. The output of the pickup tube 38 is electrically connected to a television transmitter 42 of conventional construction including a transmitting antenna 44.

In operation light from an object or a scene to be televised (not shown in FIG. 3) is focussed by the first lens system 30 onto the optical diffusion sheet 34 where it is diffused. Then the light emerges from the second lens system 32 and is incident upon the third lens system 36. The latter lens system 36 serves to form an optical image on the photosensitive layer 40 of the pickup tube 38. It is noted that the lens system 32 functions to reproduce the optical image formed by the lens system 30 and that the lens systems 30 and 32 cooperate with the lens system 36 to perform simultaneously the processes previously described in conjunction with FIGS. 1*a* and 2*a*.

The pickup tube 38 converts the optical image on the photosensitive layer 40 to an electrical signal which is, in turn, processed by the transmitter 42 in a well known manner. Then the processed signal is transmitted from the transmitting antenna 44.

In FIG. 3 the television signal from the transmitting antenna 44 is picked up by a receiving antenna 46 and processed by a television receiver 48 of conventional construction in a well known manner. The output from the receiver 48 is applied to a picture tube 50 of the well known design to reproduce on a phosphor screen 52, disposed on the front face of the tube, an optical image identical to that formed on the photosensitive layer 40 of the pick-up tube 38.

The front plate of the picture tube 50 has attached thereto a receiving fly's eye type lens system 54 similar in dimension and configuration to the third compound eye type lens system 36 on the transmitter side. The lens system 54 has its focal surface on the phosphor screen 52 of the tube 50. Also the positional relationship between the lens system 54 and the phosphor screen 52 should be quite identical to that between the third lens system 36 and the photosensitive layer 40 of the pick-up tube 38.

When a viewer schematically designated by an eye 56 (see FIG. 3) looks at the picture tube 50 through the lens system 54, he can view the imaginary image of the object or scene as if the object or scene were actually located at the position of that imaginary image.

It is here to be noted that the pick-up tube should scan from the right side to the left with respect to the picture tube for the reason that the light leaving each lens element of the first lens system 32 advances along such a path that it forms a real image at a position symmetrical to an object with respect to the diffusion sheet 34 resulting in an image viewed from the right side to the left.

Figure 4:
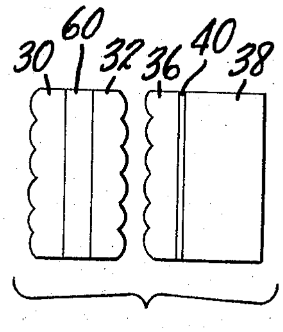
FIG. 4 is a fragmental schematic view of a modification of the invention.

FIG. 4 shows a modification of the invention wherein an optical amplifier 60 is substituted for the optical diffusion sheet 34 as shown in FIG. 3. As shown schematically by way of example in FIG. 5, the optical amplifier 60 comprises a body of photoconductive material 63 and a body of photoluminescent material 64 connected together into a unitary structure. A transparent electrode 65, for example wire mesh, is provided on the outer plane surface of the photoconductive material 63 and a second transparent electrode 66 is provided on the outer plane face of the photoluminescent material 64. The electrodes are connected to the opposite terminals of an alternating current voltage source 67 having a frequency of 400 to 600 hertz at a voltage of 200 to 250 volts.

Figure 5:
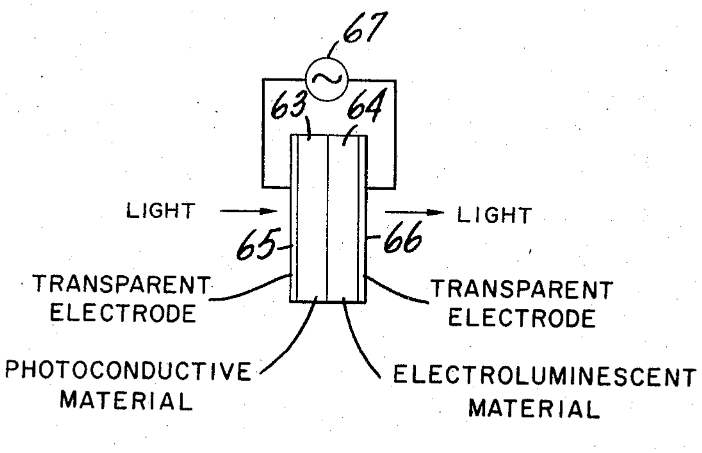
FIG. 5 is a schematic view of an optical amplifier usable in the system of the invention.

When light falls on the optical amplifier from the left as viewed in FIG. 5 through the transparent electrode 65, the impedance of the photoconductive material 63 decreases in proportion to light intensity to cause an electric field from the source 67 to be applied across the electroluminescent material 64, resulting in the emission of amplified light therefrom through the transparent electrode 66. The structure illustrated in FIG. 5 can amplify light of a wave length dependent on the type of the photoconductive material. An image formed on the surface of the photoconductive body is amplified and converted to a corresponding upright image in the form of an electroluminescent pattern on the surface of the electroluminescent material. The resulting light depends on the type of electroluminescent material and is, in some cases, green.

In other respects, the arrangement is identical to that shown in FIG. 3 and therefore like reference numerals designate the components corresponding to those shown in FIG. 3. The use of the optical amplifier 60 can greatly increase the optical sensitivity of the television transmitter unit as compared with the use of the optical diffusion plate 34.

From the foregoing it will be appreciated that the invention provides a television system for producing the three dimensional vision in the true sense. This has characteristic features quite different from those of the existing stereoscopic television systems utilizing the principles of a stereoscope. More specifically, the present system comprises using fly's eye type lens systems to photograph an object or a screen in the manner as previously described without the use of what is normally called a lens whereby the three dimensional vision can be realized as if the object were actually located in that place. In practicing the invention, it is to be noted that electronic circuitries included in the television transmitter and receiver units are required to be operated in a high frequency band as compared with the conventional television systems i.e. in the UHF band. This is because the images formed on the pick-up tube are high in space frequency.

Figure 6:
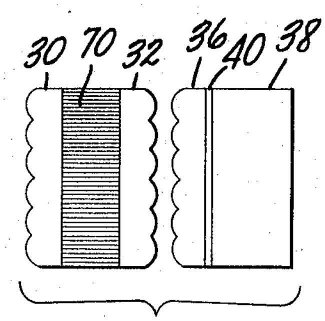
FIG. 6 is a fragmental schematic view of a further modification of the invention.

While the invention has been illustrated and described in conjunction with preferred embodiments thereof, it is to be understood that various changes and modifications may be resorted to without departing from the spirit and scope of the invention. For example, instead of the optical diffusion sheet 34, any suitable optically conductive member such as an optical fiber bundle may optically interconnect the fly's eye type lens systems 30 and 32. Thus in FIG. 6 there is shown a modification in which an optical fiber bundle 70 interconnects the lens system 30 and the lens system 32. The fiber bundle can be of any desired length and may be bent or curved instead of straight as the light rays follow the fibers even if they are curved. If desired, the optical diffusion sheet 34 or the optical amplifier 60 may be omitted.

What I claim and desire to secure by Letters Patent is:

1. In a television system for producing three dimensional vision, a television transmitter unit comprising a first focussing optical means of fly's eye type comprising an array of a multiplicity of small plano-convex spherical lens elements closely disposed in columns and rows in a plane and directly viewing an object to be televised to produce a two dimensional array of images of said object differing progressively with their position in the array, a second focussing optical means of fly's eye type of like construction disposed in back-to-back relationship with said first optical means so as to have a focal plane common to said first and second optical means, a light transmissive optical diffusion sheet sandwiched between said first focussing optical means and said second focussing optical means in said common focal plane so that each of the small spherical lens elements forming said second optical means produces an image of the image produced by the corresponding small spherical lens element of said first optical means on said light transmissive optical diffusion sheet, a third focussing optical means of fly's eye type of like construction disposed in spaced relationship to said second optical means with the convex faces of said second and third optical means facing one another so that the array of images produced by said second optical means as viewed through said third optical means forms an array of images of the object in the focal plane of said third optical means, pick-up tube means comprising a photosensitive layer disposed at the focal plane of said third focussing optical means to receive an optical image formed thereon by said third focussing optical means and means to provide a corresponding electrical signal, and transmitter means for processing and transmitting said electrical signal from said pick-up tube means.

2. A television system comprising a television transmitter unit as claimed in claim 1 and a television receiver unit including television receiver means for receiving the television signal transmitted by said television transmitter unit, picture tube means electrically connected to said television receiver means to reproduce an optical image on an image reproducing surface and a fourth focussing optical means of the fly's eye type of like construction disposed with its planar face facing said picture tube means and its focal plane coinciding with said image reproducing surface of said picture tube means, the positioned relationship between said fourth focussing optical means and said image reproducing surface of said picture tube means being identical to the positional relationship between said third focussing optical means and said photosensitive layer of said pick-up tube means.

3. A television system according to claim 2, in which said transmitter means and said receiver unit operate in the ultra high frequency band to transmit and receive images of high space frequency.

4. In a television system for producing three dimensional vision, a television transmitter unit comprising a first focussing optical means of fly's eye type comprising an array of a multiplicity of small plano-convex spherical lens elements closely disposed in columns and rows in a plane and directly viewing an object to be televised to produce a two dimensional array of images of said object differing progressively with their position in the array, a second focussing optical means of fly's eye type of like construction disposed in back-to-back relationship with said first optical means, an optical amplifier disposed between said first focussing optical means and said second focussing optical means and having an input electrode in the focal plane of said first focussing optical means and an output electrode in the focal plane of said second focussing optical means so that each of the small spherical lens elements forming said second optical means produces an image of the image produced by the corresponding small spherical lens element of said first optical means, a third focussing optical means of fly's eye type of like construction disposed in spaced relationship to said second optical means with the convex faces of said second and third optical means facing one another so that the array of images produced by said second optical means as viewed through said third optical means forms an array of images of the object in the focal plane of said third optical means, pick-up tube means comprising a photosensitive layer disposed at the focal plane of said third focussing optical means to receive an optical image formed thereon by said third focussing optical means and means to provide a corresponding electrical signal, and transmitter means for processing and transmitting said electrical signal from said pick-up tube means.

5. A television system comprising a television transmitter unit as claimed in claim 4 and a television receiver unit including television receiver means for receiving the television signal transmitted by said television transmitter unit, picture tube means electrically connected to said television receiver means to reproduce an optical image on an image reproducing surface and a fourth focussing optical means of the fly's eye type of like construction disposed with its planar face facing said picture tube means and its focal plane coinciding with said image reproducing surface of said picture tube means, the positioned relationship between said fourth focussing optical means and said image reproducing surface of said picture tube means being identical to the positional relationship between said third focussing optical means and said photosensitive layer of said pick-up tube means.

6. A television system according to claim 5, in which said transmitter means and said receiver unit operate in the ultra high frequency band to transmit and receive images of high space frequency.

7. In a television system for producing three dimensional vision, a television transmitter unit comprising a first focussing optical means of fly's eye type comprising an array of a multiplicity of small plano-convex spherical lens elements closely disposed in columns and rows in a plane and directly viewing an object to be televised to produce a two dimensional array of images of said object differing progressively with their position in the array, a second focussing optical means of fly's eye type of like construction disposed in back-to-back relationship with said first optical means, an optical fiber bundle disposed between sand interconnecting said first focussing optical means and said second focussing optical means and having an input end in the focal plane of said first focussing optical means and an output end in the focal plane of said second focussing optical means so that each of the small spherical lens elements forming said second optical means produces an image of the image produced by the corresponding small spherical lens element of said first optical means, a third focussing optical means of fly's eye type of like construction disposed in spaced relationship to said second optical means with the convex faces of said second and third optical means facing one another so that the array of images produced by said second optical means as viewed through said third optical means forms an array of images of the object in the focal plane of said third optical means, pick-up tube means comprising a photosensitive layer disposed at the focal plane of said third focussing optical means to receive an optical image formed thereon by said third focussing optical means and means to provide a corresponding electrical signal, and transmitter means for processing and transmitting said electrical signal from said pick-up tube means.

8. A television system comprising a television transmitter unit as claimed in claim 7 and a television receiver unit including television receiver means for receiving the television signal transmitted by said television transmitter unit, picture tube means electrically connected to said television receiver means to reproduce an optical image on an image reproducing surface and a fourth focussing optical means of the fly's eye type of like construction disposed with its planar face facing said picture tube means and its focal plane coinciding with said image reproducing surface of said picture tube means, the positioned relationship between said fourth focussing optical means and said image reproducing surface of said picture tube means being identical to the positional relationship between said third focussing optical means and said photosensitive layer of said pick-up tube means.

9. A television system according to claim 8, in which said transmitter means and said receiver unit operate in the ultra high frequency band to transmit and receive images of high space frequency.

* * * * *